(12) United States Patent
Itadani et al.

(10) Patent No.: US 8,256,772 B2
(45) Date of Patent: Sep. 4, 2012

(54) LIP TYPE SEAL

(75) Inventors: Masatoshi Itadani, Tokyo (JP); Hideki Kawai, Tokyo (JP); Hideki Tomoto, Tokyo (JP); Hisayuki Akagi, Tokyo (JP)

(73) Assignee: Eagle Industry Co., Ltd. (JP)

( * ) Notice: Subject to any disclaimer, the term of this patent is extended or adjusted under 35 U.S.C. 154(b) by 0 days.

(21) Appl. No.: 12/678,717

(22) PCT Filed: Aug. 28, 2009

(86) PCT No.: PCT/JP2009/065034
§ 371 (c)(1),
(2), (4) Date: Mar. 17, 2010

(87) PCT Pub. No.: WO2010/061670
PCT Pub. Date: Jun. 3, 2010

(65) Prior Publication Data
US 2011/0215536 A1    Sep. 8, 2011

(30) Foreign Application Priority Data

Nov. 27, 2008   (JP) .................................. 2008-302384
Apr. 10, 2009   (WO) .................. PCT/JP2009/057312

(51) Int. Cl.
*F16J 15/02*   (2006.01)
(52) U.S. Cl. .......................... 277/353; 277/551; 277/577
(58) Field of Classification Search .................. 277/353, 277/549, 551, 562, 564, 568, 572, 576–577
See application file for complete search history.

(56) References Cited

U.S. PATENT DOCUMENTS

| | | | | |
|---|---|---|---|---|
| 3,276,783 A * | 10/1966 | Mckinven, Jr. | ................ | 277/562 |
| 3,771,799 A * | 11/1973 | Sekulich et al. | ............... | 277/346 |
| 4,721,314 A * | 1/1988 | Kanayama et al. | ............ | 277/576 |
| 4,822,059 A * | 4/1989 | Shimasaki et al. | ............ | 277/564 |
| 5,083,802 A * | 1/1992 | Shimasaki et al. | ............ | 277/560 |
| 6,123,514 A * | 9/2000 | Kawaguchi et al. | ........ | 417/222.2 |
| 6,517,082 B2 * | 2/2003 | Yamada et al. | ............... | 277/559 |
| 6,517,083 B2 * | 2/2003 | Yamada et al. | ............... | 277/562 |
| 7,147,229 B2 * | 12/2006 | Madigan | ....................... | 277/551 |
| 7,467,797 B2 * | 12/2008 | Oiyama et al. | ................ | 277/553 |

FOREIGN PATENT DOCUMENTS

| | | |
|---|---|---|
| JP | 10-318377 A | 12/1998 |
| JP | 2006-300191 A | 11/2006 |
| JP | 10-3137481 U | 11/2007 |
| WO | WO-2004/076894 A1 | 9/2004 |

* cited by examiner

*Primary Examiner* — Vishal Patel
(74) *Attorney, Agent, or Firm* — Harness, Dickey & Pierce, P.L.C.

(57) ABSTRACT

For better assembling characteristic and sealing performance with secured circularity and coaxiality of a seal lip, a lip type seal installed to an inner periphery of a shaft hole of a housing in slidable contact with a peripheral surface of a shaft for inhibiting a sealed fluid in the machine from leaking to an atmospheric air side, has a cartridge fitted to an inner periphery of the shaft hole, a first lip seal member made of a rubber-like elastic material and fitted in a non-bonding manner to the cartridge, a case fitted in a non-bonding manner to the first lip seal member, a second lip seal member made of a resin and a backup ring supporting the second lip seal member which are retained by caulking to the case, and an adapter fitted to the cartridge at a sealed fluid side of the first lip seal member.

12 Claims, 5 Drawing Sheets

LIP TYPE SEAL

CROSS-REFERENCE TO RELATED APPLICATIONS

This is a national stage of the International Application No. PCT/JP2009/065034, filed on Aug. 28, 2009. This application claims the benefit of Japanese Application No. 2008-302384, filed Nov. 27, 2008 and International Application No. PCT/JP2009/057312, filed Apr. 10, 2009, The disclosures of the above applications are incorporated herein by reference.

BACKGROUND OF THE INVENTION

1. Field of the Invention

The present invention relates to a lip type seal corresponding to one kind of a sealing apparatus. The lip type seal in accordance with the present invention is used, for example, as a shaft seal or the like for a water pump (W/P) for a vehicle such as a motor vehicle or the like, or is used as a shaft seal for a W/P for a consumer electrical appliance or a light load industrial use.

2. Description of the Conventional Art

Figure 9:
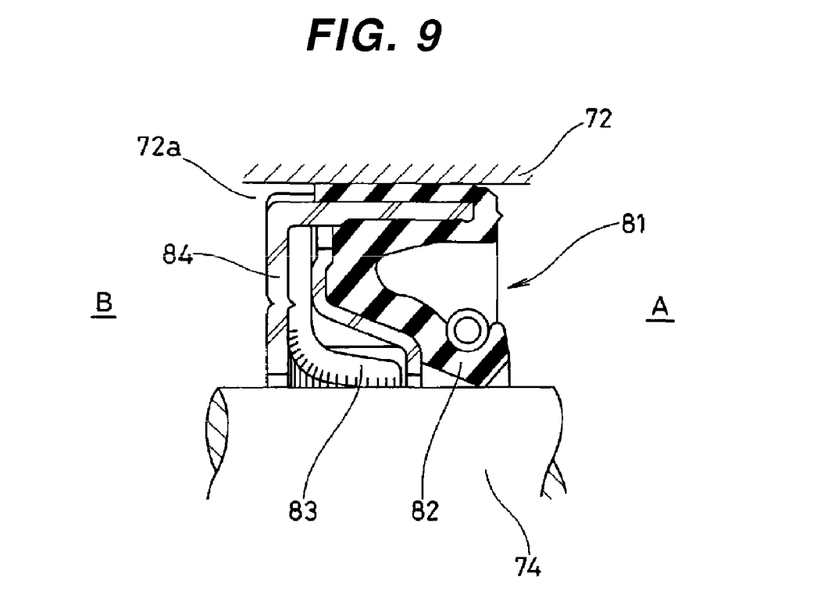
FIG. 9 is a half sectional view of a lip seal in accordance with a conventional art.

Conventionally, as shown in FIG. 9, there has been known a lip type seal 81 which is installed to an inner periphery of a shaft hole 72a of a housing 72 and slidably comes into close contact with a peripheral surface of a shaft 74 inserted to the shaft hole 72a, thereby inhibiting a sealed fluid within the machine from leaking out to an atmospheric air side, and this lip type seal 81 has a first seal lip 82 which is arranged in a sealed fluid side A and is made of a rubber-like elastic material, and a second seal lip 83 which is arranged in an atmospheric air side B and made of a resin (refer to patent document 1).

Since the conventional lip type seal 81 mentioned above has a plurality of seal lips 82 and 83 each of which performs a seal operation, an excellent seal effect can be achieved, however, has a disadvantage in the following point.

In particular, on the basis of necessity for recycle in an environmental problem in recent years, it is required to dispose of each of constructing parts of the lip type seal after being sorted on material, however, in the conventional lip type seal 81 mentioned above, the first lip seal 82 made of the rubber-like elastic material is bonded via vulcanization to a reinforcing ring 84 made of a metal, and both the elements 82 and 84 are formed as an integral vulcanization molded product. Accordingly, it is impossible to easily separate and sort both the elements 82 and 84 at a time of disposing, and it is therefore impossible to comply with the necessity for the recycle mentioned above.

Figure 10:
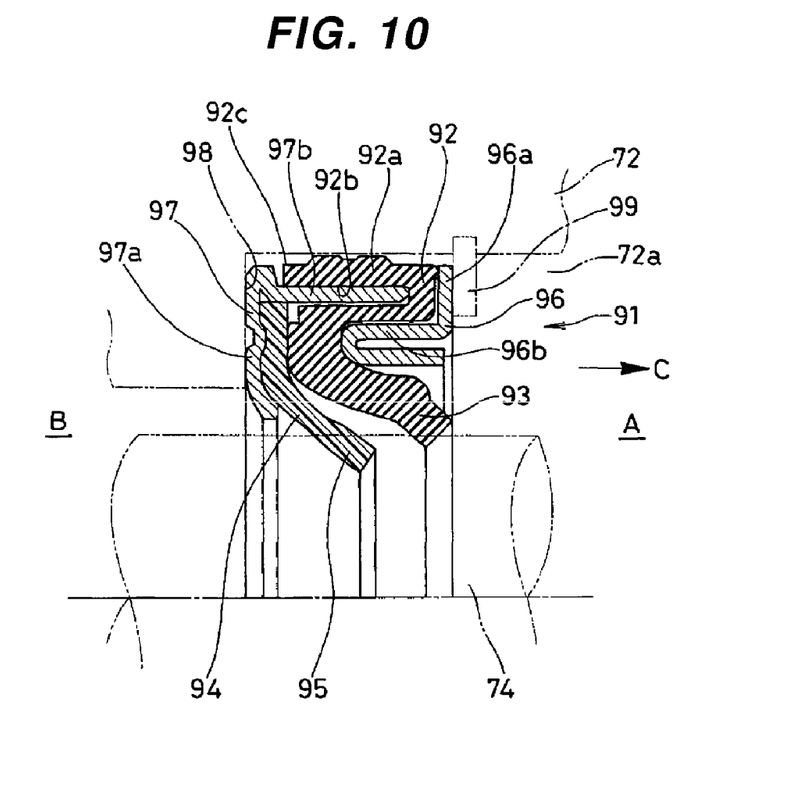
FIG. 10 is a half sectional view of a lip seal in accordance with another conventional art.

Accordingly, the applicant of the present invention has proposed a lip type seal 91 having a first lip seal member 92 provided with a first seal lip 93 arranged at a sealed fluid side A and made of a rubber-like elastic material, a second lip seal member 94 provided with a second seal lip 95 arranged at an atmospheric air side B and made of a resin, and two cases 96 and 97 pinching both the lip seal members 92 and 94 from both sides in an axial direction and made of a metal, and having a structure in which these four parts are assembled without being bonded, as shown in FIG. 10 (refer to patent document 2). In accordance with this prior art, since each of the parts is not bonded, it is possible to easily separate and sort each of the parts. Accordingly, it is possible to comply with the necessity for the recycle mentioned above. However, in the prior art, there is room of improvement in the following points.

(1) Assembly Retaining Characteristic Between Constructing Parts

In particular, in the lip type seal 91 mentioned above, two cases 96 and 97 are respectively structured such as to have annular flat surface portions 96a and 97a for pinching both the lip seal members 92 and 94 from both sides in an axial direction and have tubular portions 96b and 97b integrally formed with the flat surface portions 96a and 97a, and the tubular portions 96b and 97b are fitted to an inner peripheral side of a cylinder portion 92a of the first lip seal member 92 in the case 96 at the sealed fluid side A, and are pressure inserted and fixed to an insertion hole 92b provided in the cylinder portion 92a of the first lip seal member 92 in the case 97 at the atmospheric air side B. Accordingly, each of the parts is retained in an assembled state on the basis of setting of a fitting margin and a pressure inserting margin required for the fitting and the pressure insertion, however, an engagement structure for preventing a separation in an axial direction among the parts in the case that each of the parts is exposed to force in the axial direction is not particularly provided among the parts. Therefore, if the case 96 at the sealed fluid side A is pulled in an axial direction (a direction of an arrow C) so as to detach the lip type seal 91 in a state of being installed to an inner periphery of the shaft hole 72a of the housing 72, there is a case that only this case 96 is pulled out and the other parts remain in an installed state (alternatively, there may be a case that only the case 96 and the first lip seal member 92 are pulled out, and the second lip seal member 94 and the case 97 at the atmospheric air side B remain). This is nothing but the assembling and retaining force among the parts is dependent only upon friction force.

(2) Installing Workability

Further, in the lip type seal 91 mentioned above, two cases 96 and 97 do not particularly have any structure for defining an interval in an axial direction therebetween. Further, the first lip seal member 92 pinched between both the elements and made of the rubber-like elastic material can achieve a sufficient seal operation only by being used in a state of being compressed in the axial direction. In other words, there is a risk that a leak of a sealed fluid is caused from the portion between the first lip seal member 92 and the second lip seal member 94 made of the resin or the case 97 at the atmospheric air side B. Accordingly, at a time of installing the lip type seal 91 mentioned above, the lip type seal 91 is installed by using a snap ring 99 while bringing the lip type seal 91 into contact with a step portion 98 provided in an inner periphery of the shaft hole 72a of the housing 72 so as to apply a compression load in the axial direction, whereby the lip type seal 91 is installed in a state in which a whole thereof is compressed in the axial direction between the step portion 98 and the snap ring 99. However, there is such a disadvantage that a work of installing by using the snap ring 99 while applying the compression load in the axial direction as mentioned above is extremely complicated.

Further, since the cylinder portion 92a of the first lip seal member 92 is provided with the annular insertion hole 92b which is open to the atmospheric air side B, a portion at an outer peripheral side from the insertion hole 92b in the cylinder portion 92a is formed in such a shape that the atmospheric air side end portion 92c is terminated in the cylindrical shape. Accordingly, since the atmospheric air side end portion 92c rubs the inner peripheral surface of the shaft hole 72a at a time of inserting the first lip seal member 92 into the inner periphery of the shaft hole 72a of the housing 72, there is a case that an evagination is generated at the atmospheric air side end portion 92c.

PRIOR ART DOCUMENT

Patent Document

Reference is made to Japanese Unexamined Patent Publication No. 10-318377 and International Application No. WO2004/076894A1.

Further, as for a bonded type lip seal in which the seal lip 82 made of the rubber-like elastic material is bonded via vulcanization to the reinforcing ring 84 made of the metal as shown in FIG. 9, there is pointed out a problem of a foaming resistance. In other words, together with a high speed and a high temperature tendency of an engine in recent years, cooling water of the water pump cooling the engine tends to have a high temperature and a high pressure, and a seal portion ambient atmosphere becomes severe. In the bonded type lip seal used under the condition mentioned above, since the seal lip 82 made of the rubber-like elastic material and the reinforcing ring 84 made of the metal are bonded, there is a case that a foaming phenomenon is generated in the seal lip 82 in the case of being used under a high load condition, thereby lowering a sealing performance.

SUMMARY OF THE INVENTION

Problem to be Solved by the Invention

The present invention is made by taking the points mentioned above into consideration, and an object of the present invention is to provide a lip type seal in which constructing parts of the lip type seal can be easily separated and sorted per material, whereby it is possible to comply with necessity for recycle, an assembly retaining characteristic among the constructing parts is good, and installing workability is good. In addition, an object of the present invention is to provide a lip type seal which can stabilize a sealing performance while having a good foaming resistance. Further, in addition, an object of the present invention is to provide a lip type seal which has a good assembling characteristic of a first lip seal member made of a rubber-like elastic material with respect to a cartridge, and can secure circularity and coaxiality of the seal lip of the first lip seal member, whereby it is possible to stabilize a sealing performance from this point of view. Further, in addition, an object of the present invention is to provide a lip type seal which can prevent the constructing parts of the lip type seal from being relatively displaced in a circumferential direction, whereby an assembly retaining characteristic among the parts is good from this point of view, and it is possible to stabilize a sealing performance.

Means for Solving the Problem

In order to achieve the objects mentioned above, in accordance with claim 1 of the present invention, there is provided a lip type seal inhibiting a sealed fluid in a machine from leaking to an atmospheric air side by being installed to an inner periphery of a shaft hole of a housing so as to slidably come into close contact with a peripheral surface of a shaft, the lip type seal having:

a cartridge fitted to an inner periphery of the shaft hole;

a first lip seal member made of a rubber-like elastic material and fitted in a non-bonding manner to the cartridge;

a case fitted in a non-bonding manner to the first lip seal member;

a second lip seal member made of a resin and a backup ring supporting the second lip seal member which are retained by caulking to the case; and an adapter fitted to the cartridge at a sealed fluid side of the first lip seal member, wherein the cartridge integrally has an inward flange portion on an atmospheric air side end portion of the tubular portion, the first lip seal member integrally has a cylinder portion fitted to an inner peripheral side of the tubular portion of the cartridge, a radial portion provided on a sealed fluid side end portion of the cylinder portion, and a seal lip provided on an inner peripheral end portion of the radial portion, the case integrally has a tubular portion fitted to a portion between the radial portion and the flange portion of the cartridge in an inner peripheral side of the cylinder portion of the first lip seal member, a first flange portion provided on the sealed fluid side end portion of the tubular portion in such a manner as to come into contact with the radial portion, and a second flange portion provided on the atmospheric air side end portion of the tubular portion in such a manner as to come into contact with the flange portion of the cartridge, the second lip seal member and the backup ring are retained by caulking between the first and second flange portions, and the adapter prevents the first lip seal member from coming off from the cartridge by being fitted to the cartridge at the sealed fluid side of the first lip seal member.

Further, in accordance with the second aspect of the present invention, there is provided a lip type seal as recited in the first aspect mentioned above, wherein a convex portion at a part on a circumference is provided in the atmospheric air side end surface of the first flange portion in the case, and the convex portion engages with the second lip seal member made of the resin, whereby the case and the second lip seal member are prevented from rotating.

Further, in accordance with the third aspect of the present invention, there is provided a lip type seal as recited in the second aspect mentioned above, wherein the convex portion is formed by a press work, whereby a concave portion at a part on a circumference corresponding to the convex portion is provided in the sealed fluid side end surface of the first flange portion, and the first lip seal member made of the rubber-like elastic material engages with the concave portion, whereby the case and the first lip seal member are prevented form rotating.

Further, in accordance with the fourth aspect of the present invention, there is provided a lip type seal as recited in the first aspect, the second aspect or the third aspect mentioned above, wherein a claw portion at a part on a circumference is provided on an inner peripheral edge portion of the flange portion in the cartridge, a notch portion is provided in an inner peripheral edge portion of the second flange portion in the case in correspondence to the claw portion, and the claw portion is bent so as to engage with the notch portion, whereby the cartridge and the case are prevented from rotating.

Further, in accordance with the fifth aspect of the present invention, there is provided a lip type seal as recited in the first aspect, the second aspect, the third aspect or the fourth aspect mentioned above, wherein an annular projection coming into close contact over a whole periphery with the sealed fluid side end surface of the second lip seal member at an inner peripheral side of the first flange portion in the case is provided on an atmospheric side end surface of the radial portion in the first lip seal member.

The lip type seal in accordance with the present invention having the structure mentioned above is installed to the inner periphery of the shaft hole of the housing so as to slidably come into close contact with the peripheral surface of the shaft, thereby inhibiting the sealed fluid within the machine from leaking to the atmospheric air side, and has six parts including the cartridge, the first lip seal member made of the rubber-like elastic material, the case, the second lip seal member made of the resin, the backup ring and the adapter, as the constructing parts. Among them, the first lip seal member made of the rubber-like elastic material is fitted to the cartridge in a non bonding manner, the case is fitted to the first lip seal member in a non-bonding manner, the second lip seal member made of the resin and the backup ring are retained by caulking to the case, and the adapter is fitted to the cartridge (fitting between the metals). Accordingly, since six parts are assembled in the non bonding manner without being bonded to each other, it is possible to easily separate and sort each of the parts at a time of dissembling the seal.

Further, since the second lip seal member and the backup ring are retained by caulking to the case, these three parts are firmly assembled to each other even in the non-bonding manner, and are not relatively displaced in the axial direction. Since the case is arranged in such a manner that the first flange portion at the sealed fluid side comes into contact with the radial portion of the first lip seal member, and is arranged in such a manner that the second flange portion at the atmospheric air side comes into contact with the flange portion of the cartridge, the cartridge, the case and the first lip seal member are positioned with each other accurately in the axial direction. Since the adapter is fitted to the cartridge at the sealed fluid side of the first lip seal member, the first lip seal member does not come off from the cartridge in the axial direction. Accordingly, since all of six parts are firmly assembled in conjunction with each other, it is possible to increase the assembly retaining force among the parts.

Further, in the lip type seal in accordance with the present invention having the structure mentioned above, six parts have been already integrated by caulking and fitting at a time of installing the seal to the housing, and the assembly is finished in a state of being usable immediately. Accordingly, it is possible to omit a regulating step or the like for maintaining an assembly length precision in the axial direction which is necessary in the installing step of the conventional non-bonded type lip seal mentioned above.

Further, since the first lip seal member made of the rubber-like elastic material is fitted in the non-bonding manner to the cartridge, and the case is fitted in the non-bonding manner to the first lip seal member, the lip type seal does not have such a structure that the rubber-like elastic material (the first lip seal member) is vulcanization bonded to the metal (the cartridge or the case). Therefore, even if the lip type seal is used under a high load condition, a foaming phenomenon which is peculiar to the bonding structure is not generated in the rubber-like elastic material.

In this case, as an assembling procedure of the lip type seal, there is employed a step of fixing by caulking the second lip seal member made of the resin and the backup ring by the case, putting the first lip seal member made of the rubber-like elastic material thereon, and thereafter inserting it to the cartridge, however, if the first lip seal member made of the rubber-like elastic material largely deforms at a time of inserting, there is fear that the circularity and the coaxiality of an end of the seal lip are deteriorated. Then, in accordance with the present invention, the structure is made such that the first lip seal member is prevented from coming off from the cartridge by fitting the adapter to the sealed fluid side of the first lip seal member without largely deforming the first lip seal member at a time of inserting.

Accordingly, since the function of the adapter exists in preventing the first lip seal member from coming off from the cartridge without largely deforming, it is preferable not to press the adapter to the first lip seal member too much (if the adapter is pressed to the first lip seal member strongly, there is fear that the first lip seal member deforms and the circularity and the coaxiality of the seal lip end are deteriorated). Further, in the case that the deformation in the axial direction is thinkable due to a swelling or the like of the first lip seal member by the sealed fluid, an initial gap in an axial direction may be set between the first lip seal member and the adapter. In this case, the adapter may be pressed to the first lip seal member in a range that the circularity and the coaxiality of the seal lip can be maintained, thereby enabling to construct a part of a structure suppressing a co-rotation of the first lip seal member with respect to the shaft. Further, a projection may be provided in the first lip seal member or the adapter which comes into contact with each other, and if the projection is provided as mentioned above, it is possible to enhance a co-rotation suppressing effect.

Further, the increase of the assembly retaining force among the parts mentioned above is mainly provided for preventing the parts from being relatively displaced in the axial direction, however, there is a case that a countermeasure is demanded so as to prevent the parts from being relatively displaced in a circumferential direction. As mentioned above, since the second lip seal member and the backup ring are retained by caulking to the case, and the case is fitted to the portion between the radial portion and the flange portion of the cartridge at the inner peripheral side of the cylinder portion of the first lip seal member, each of the parts is prevented to some extent from rotating on the basis of the caulking force and the fitting margin, however, there is a case that a further rotation preventing countermeasure is demanded. Accordingly, in the case mentioned above, the convex portion at a part on the circumference is provided in the atmospheric air side end surface of the first flange portion in the case, and the case and the second lip seal member are prevented from rotating by engaging the convex portion with the second lip seal member made of the resin (second aspect). Further, since the concave portion at a part on the circumference corresponding to the convex portion is provided in the back face (the sealed fluid side end surface) of the first flange portion when the convex portion is formed by the press work, the case and the first lip seal member are prevented from rotating by utilizing the concave portion and engaging the first lip seal member made of the rubber-like elastic material with the concave portion (third aspect). Further, the cartridge and the case are prevented from rotating by providing the claw portion at a part on the circumference on the inner peripheral edge portion of the flange portion in the cartridge, providing the notch portion in the inner peripheral edge portion of the second flange portion in the case in correspondence to the claw portion, and bending the claw portion so as to engage with the notch portion (fourth aspect). In accordance with these structures, it is possible to effectively prevent the parts from rotating only by providing the convex portion, the concave portion, the claw portion and the notch portion at a part on the circumference in the case.

Further, there can be thought that the annular projection coming into close contact over a whole periphery with the sealed fluid side end surface of the second lip seal member at the inner peripheral side of the first flange portion in the case is provided on the atmospheric air side end surface in the radial portion in the first lip seal member (fifth aspect). In this case, the sealing performance of the portion can be enhanced, and since the seal portion presses the second lip seal member over a whole periphery, it is possible to stabilize an attitude of the second lip seal member.

Effect of the Invention

The present invention achieves the following effects.

In the present invention, since the lip type seal has six parts including the cartridge, the first lip seal member made of the rubber-like elastic material, the case, the second lip seal member made of the resin, the backup ring and the adapter, as mentioned above, the first lip seal member is fitted in the non-bonding manner to the cartridge among them, the case is fitted in the non-bonding manner to the first lip seal member, the second lip seal member and the backup ring are retained by caulking to the case, and the adapter is fitted to the cartridge, it is possible to easily separate and sort each of the parts at a time of dissembling the seal. Accordingly, it is possible to comply with the necessity for the recycle that the constructing parts of the lip type seal are disposed after being sorted on the material.

Further, since the second lip seal member and the backup ring are retained by caulking to the case, these three parts can be firmly assembled together even in the non-bonding manner. Since the case is arranged in such a manner that the first flange portion at the sealed fluid side comes into contact with the radial portion of the first lip seal member, and is arranged in such a manner that the second flange portion at the atmospheric air side comes into contact with the flange portion of the cartridge, the cartridge, the case and the first lip seal member are positioned with each other accurately in the axial direction. Since the adapter is fitted to the cartridge at the sealed fluid side of the first lip seal member, the first lip seal member does not come off in the axial direction from the cartridge. Accordingly, since all of six parts can be firmly assembled in conjunction with each other, it is possible to increase the assembly retaining force among the parts. Therefore, it is possible to prevent such a disadvantage that only some of the parts are pulled out at a time of detaching the lip type seal from the housing like as the prior art from being generated.

Further, since six parts have been already assembled completely at a time of installing the lip type seal to the housing, it is possible to omit the regulating step or the like for maintaining the assembly length precision in the axial direction which has been required in the installing step of the conventional unbonded lip seal.

Further, since such a structure that the rubber-like elastic material (the first lip seal member) is vulcanization bonded to the metal (the cartridge or the case) is not provided, the foaming phenomenon is not generated in the rubber-like elastic material even if the lip type seal is used under the high load condition. Accordingly, it is possible to improve the foaming resistance of the lip type seal, and it is possible to stabilize the sealing performance.

Further, since the structure is made such that the first lip seal member is prevented from coming off from the cartridge by fitting the adapter to the sealed fluid side of the first lip seal member, without deforming the first lip seal member largely at a time of inserting the first lip seal member made of the rubber-like elastic material to the cartridge, the first lip seal member does not deform too much. As a result, it is possible to secure the circularity and the coaxiality of the seal lip of the first lip seal member. Accordingly, it is possible to stabilize the sealing performance by the seal lip of the first lip seal member.

Further, when the case and the second lip seal member are prevented from rotating by providing the convex portion at a part on the circumference in the atmospheric air side end surface of the first flange portion in the case, and engaging the convex portion with the second lip seal member made of the resin, it is possible to effectively prevent the parts from rotating with each other by the structure in which the convex portion at a part on the circumference is only provided in the case. Accordingly, it is possible to prevent the second lip seal member made of the resin from co-rotating on the basis of the sliding motion with the shaft, and it is possible to stabilize the sealing performance.

Further, since the concave portion at a part on the circumference corresponding to the convex portion is provided in the back surface of the first flange portion when the convex portion is formed by the press work, the case and the first lip seal member are prevented from rotating by utilizing the concave portion and engaging the first lip seal member made of the rubber-like elastic material with the concave portion. In accordance with this structure, it is possible to prevent the assembled product constructed by the second lip seal member, the backup ring and the case from co-rotating due to the sliding motion with the shaft, whereby it is possible to stabilize the sealing performance.

Further, when the cartridge and the case are prevented from rotating by providing the claw portion at a part on the circumference on the inner peripheral edge portion of the flange portion in the cartridge, providing the notch portion in the inner peripheral edge portion of the second flange portion in the case in correspondence to the claw portion, and bending the claw portion so as to engage with the notch portion, it is possible to effectively prevent the parts from rotating by the structure in which the claw portion at a part on the circumference and the notch portion are only provided in the cartridge and the case. Accordingly, it is possible to prevent the assembled product constructed by the second lip seal member made of the resin, the backup ring and the case from co-rotating by the sliding motion with the shaft, and it is possible to stabilize the sealing performance.

Further, when the annular projection coming into close contact over a whole periphery with the sealed fluid side end surface of the second lip seal member at the inner peripheral side of the first flange portion in the case is provided on the atmospheric air side end surface of the radial portion in the first lip seal member, it is possible to improve the sealing performance of the portion. Further, since the seal portion presses the second lip seal member over a whole periphery, it is possible to stabilize the attitude of the second lip seal member, and it is possible to stabilize the sealing performance from this point of view.

DETAILED DESCRIPTION OF PREFERRED EMBODIMENT

The following modes for carrying out the invention are included in the present invention.

(1) Since it is possible to suppress elongation of the rubber lip toward a liquid side and it is possible to assist in a rotation prevention with respect to a torque on the basis of contact resistance there, by pressing a rubber lip liquid side portion by the adapter, it is possible to lower a fastening margin of a rubber lip outer diameter portion. As a result, it is possible to suppress a deformation of the rubber lip.

(2) Further, since the rubber lip does not come off to the liquid side by the adapter, it is not necessary to form the rubber lip in a C-shaped section shape so as to provide a back surface portion. Accordingly, it is possible to release a residual stress of the rubber lip which is fixed at the liquid side by the adapter at a time of inserting the cartridge to the atmospheric air side, and it is possible to conduct an expanding direction of the rubber lip to the atmospheric air side.

(3) On the basis of a structure in which the adapter is applied, (i) it is possible to inhibit the rubber lip from expanding to the liquid side and prevent it from coming off, (ii) it is possible to suppress a deforming amount of the rubber lip by reducing a fastening margin of the rubber lip, and (iii) it is possible to achieve such an induction that the expanding direction of the rubber lip comes to the atmospheric air side, by deleting the back surface portion of the rubber lip. Accordingly, the circularity and the coaxiality of the rubber lip are improved, and it is possible to obtain an improvement of a sealing performance.

Embodiment

Next, a description will be given of embodiments in accordance with the present invention with reference to the accompanying drawings.

First Embodiment

Figure 1:
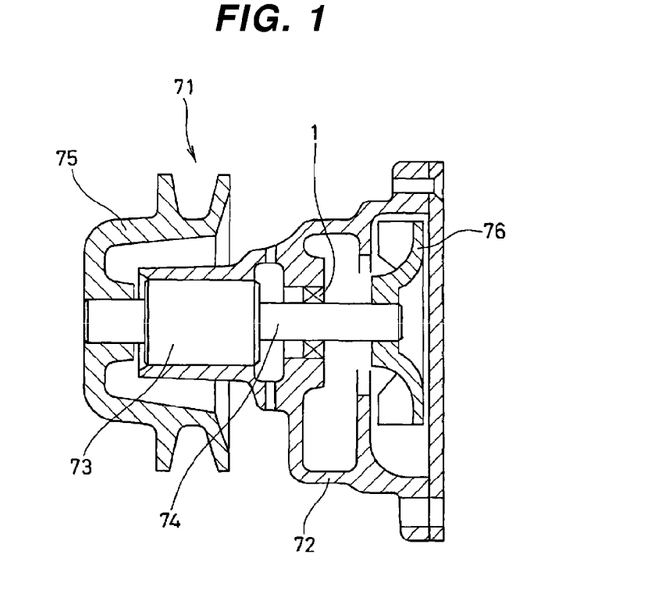
FIG. 1 is a sectional view of a water pump to which a lip type seal in accordance with a first embodiment of the present invention is installed.

FIG. 1 shows a general view of a water pump 71 to which a lip type seal 1 in accordance with a first embodiment of the present invention is installed. In particular, a pulley 75 is fixed to one end of a shaft (a rotating shaft) 74 rotatably supported to a housing (a casing) 72 via a bearing 73, and an impeller 76 is fixed to the other end thereof. If a drive torque is transmitted to the pulley 75, the impeller 76 is rotated so as to pressure feed cooling water. The lip type seal 1 inhibits a sealed fluid (cooling water) within the machine from leaking to an atmospheric air side (a bearing side) by being installed to an inner periphery of a shaft hole of the housing 72 so as to slidably come into contact with a peripheral surface of the shaft 74.

Figure 2:
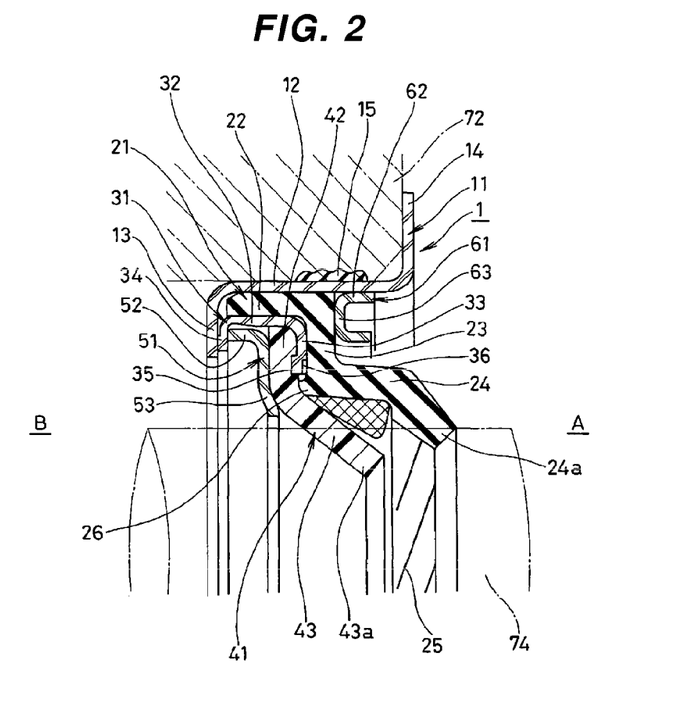
FIG. 2 is a sectional view of a substantial part of the lip type seal.

FIG. 2 shows a section of a substantial part of the lip type seal 1 in accordance with the first embodiment, and the lip type seal 1 is constructed as follows. A right side of the figure corresponds to a sealed fluid side A, and a left side of the figure corresponds to an atmospheric air side B.

In particular, the lip type seal 1 is installed to an inner periphery of a shaft hole in the housing 72 so as to slidably come into close contact with a peripheral surface of the shaft 74, and is constructed as a two-stage lip structure while having a seal lip 24 which is made of a rubber-like elastic material and is arranged at the sealed fluid side A, and a seal lip 43 which is made of a resin and is arranged at the atmospheric air side B.

Further, the lip type seal 1 has six parts including a cartridge 11 which is fitted to the inner periphery of the shaft hole in the housing 72, a first lip seal member 21 which is made of a rubber-like elastic material and is fitted and retained in a non-bonding manner to the cartridge 11, a case 31 which is fitted and retained in an non-bonding manner to the first lip seal member 21, a second lip seal member 41 which is made of a resin and is retained by caulking to the case 31, a backup ring 51 which is also retained by caulking to the case 31 and is arranged at the atmospheric air side B of the second lip seal member 41 so as to support the second lip seal member 41, and an adapter 61 which prevents the first lip seal member 21 from coming off from the cartridge 11 by being fitted to the cartridge 11 to the sealed fluid side A of the first lip seal member 21, as constructing parts thereof.

Among them, first of all, the cartridge 11 is constructed by a predetermined rigid material such as a metal or the like, for example, by a press product of a metal plate, is formed in an annular shape as a whole, has a tubular portion 12 which is fitted to the inner periphery of the shaft hole of the housing 72, and is structured such that a flange portion (an inward flange portion) 13 is integrally formed from an atmospheric air side end portion of the tubular portion 12 toward an inner side in a radial direction. Further, an outward flange portion 14 is integrally formed on a sealed fluid side end portion of the tubular portion 12 toward an outer side in the radial direction. The former flange portion 13 acts as an end wall portion with which the case 31 is brought into contact from one side in an axial direction at a time of assembling the lip type seal 1, and acts as an end wall portion which pinches the case 31 and the first lip seal member 21 between it and the adapter 61 after being assembled. The latter outward flange portion 14 achieves an action of regulating an insertion length (an insertion depth in an axial direction) by bringing into contact with a peripheral edge portion of an opening of the shaft hole of the housing 72 at a time of inserting the lip type seal 1 to the shaft hole of the housing 72, however, in the case that the lip type seal 1 is installed to a deep portion of the shaft hole, there is a case that it is omitted. Further, an outer peripheral seal portion 15 constructed by an elastic membrane and interposed between the cartridge 11 and the inner peripheral surface of the shaft hole so as to achieve a sealing action is attached over a whole periphery to an outer peripheral surface of the tubular portion 12.

The first lip seal member 21 is constructed by a predetermined rubber-like elastic material (for example, H-NBR), is formed in an annular shape as a whole, and has a cylinder portion 22 which is fitted to an inner peripheral side of the tubular portion 12 of the cartridge 11 in a non-bonding manner, an annular radial portion 23 is integrally formed from a sealed fluid side end portion of the cylinder portion 22 toward an inner side in a radial direction, and a seal lip (a first seal lip) 24 is integrally formed from an inner peripheral end portion of the radial portion 23 toward the sealed fluid side A. The seal lip 24 is structured such as to slidably come into close contact with a peripheral surface of a shaft 74 by its lip end 24a, and is provided in a sliding portion with a screw portion (a screw seal) 25 which carries out a pumping action at a time when the shaft rotates.

The case 31 is constructed by a press worked product of a metal plate (for example, a stainless steel or a steel (SPCC, SPHC or the like)), is formed in an annular shape as a whole, and has a tubular portion 32 which is fitted in a non-bonding manner between the radial portion 23 and the flange portion 13 of the cartridge 11 in an inner peripheral side of the cylinder portion 22 of the first lip seal member 21, a first flange portion 33 is integrally formed from a sealed fluid side end portion of the tubular portion 32 toward an inner side in a radial direction, and a second flange portion 34 is integrally formed from an atmospheric air side end portion of the tubular portion 32 toward an inner side in the radial direction. Accordingly, the case 31 is formed in a C-shaped section which is open toward an inner side in the radial direction as a whole, and the tubular portion 32, the first flange portion 33 and the second flange portion 34 come into close contact with the cylinder portion 22, the radial portion 23 and the flange portion 13, respectively after being assembled. A convex portion 35 and a concave portion 36 for preventing a rotation are formed in the first flange portion 33, however, a description of them will be given later.

The second lip seal member 41 is constructed by a predetermined resin material (for example, PTFE), is formed in an annular shape as a whole, and has an annular flat surface portion 42, a seal lip (a second seal lip) 43 is integrally formed on an inner peripheral end portion of the flat surface portion 42 in such a manner as to be inclined to the sealed fluid side A. Since the seal lip 43 is structured such as to slidably come into close contact with a peripheral surface of the shaft 74 by its lip end 43a, and is arranged at the atmospheric air side B of the first seal lip 24, the seal lip 43 forms a secondary seal, while the first seal lip 24 forms a primary seal.

The backup ring 51 is constructed by a press worked product of a metal plate (for example, a stainless steel or a steel (SPCC, SPHC or the like)) similarly to case 31, is formed in an annular shape as a whole, and has a cylinder portion 52, and a flange portion 53 is integrally formed from a sealed fluid side end portion of the cylinder portion 52 toward an inner side in a radial direction. The backup ring 51 is arranged at the atmospheric air side B of the second lip seal member 41, and carries out an action supporting the second lip seal member 41 from the atmospheric air side B thereof.

The second lip seal member 41 and the backup ring 51 are retained by caulking by the case 31 as mentioned above, and the flat surface portion 42 of the second lip seal member 41 and the cylinder portion 52 of the backup ring 51 are fixed by caulking between the first and second flange portions 33 and 34 in an inner peripheral side of the tubular portion 32 of the case 31 so as to be side by side in an axial direction. The caulking work is carried out by bending the second flange portion 34 having a comparatively thin bending portion. After caulking, the second lip seal member 41 comes into pressure contact with the first flange portion 33 by the flat surface portion 42.

The adapter 61 is constructed by a press worked product of a metal plate (for example, a stainless steel or a steel (SPCC, SPHC or the like)) similarly to the case 31 and the backup ring 51, is formed in an annular shape as a whole, and has an annular portion 62 which is fitted to an inner peripheral side of the tubular portion 12 of the cartridge 11 at the sealed fluid side A of the cylinder portion 22 of the first lip seal member 21, an inward flange-shaped presser foot portion 63 is integrally formed from an atmospheric air side end portion of the annular portion 62 toward an inner side in a radial direction, and an inner peripheral end portion of the presser foot portion 63 is bent to the sealed fluid side A. The adapter 61 is structured such as to press the first lip seal member 21 by the presser foot portion 63, prevent it from coming off, and stabilize an attitude thereof, and an inner diameter of the presser foot portion 63 is set to be smaller than an outer diameter of the first flange portion 33 of the case 31 in order to sufficiently achieve a function thereof, and is thereby structured such as to pinch a part of the radial portion 23 of the first lip seal member 21 between both the elements 33 and 63.

Further, a rotation preventing structure for preventing a rotation between the case 31 and the second lip seal member 41 is provided, and the rotation preventing structure is constructed by a convex portion 35 provided in the first flange portion 33 of the case 31. In other words, the convex portion 35 at a part on a circumference is provided in the atmospheric air side end surface of the first flange portion 33 in the case 31, and the convex portion 35 engages with the second lip seal member 41 in a circumferential direction, whereby the case 31 and the second lip seal member 41 are prevented from rotating. The engagement is achieved by the convex portion 35 biting into the surface of the second lip seal member 41 on the basis of a caulking force at a time of a caulking work, however, may be achieved by previously making a corresponding concave portion in the second lip seal member 41 and fitting the convex portion 35 thereto.

Further, since the case 31 is constructed by the press worked product of the metal plate as mentioned above, the concave portion 36 at a part on the circumference corresponding to the convex portion 35 is formed in the sealed fluid side end surface of the first flange portion 33 by forming the convex portion 35 mentioned above in accordance with the press working. Accordingly, the first lip seal member 21 made of the rubber-like elastic material engages with the concave portion 36 in the circumferential direction, whereby the case 31 and the first lip seal member 21 are prevented from rotating, and the rotation preventing structure is also provided here. The engagement is achieved by a part of rubber of the first lip seal member 21 protruding into the concave portion 36 by utilizing a pressure insertion margin of the case 31 with respect to the first lip seal member 21, however, may be achieved by previously making a corresponding convex portion on the first lip seal member 21 and fitting it to the concave portion 36. A desired number of convex portion 35 and concave portion 36 are provided on the circumference, in other words, the concave portion 35 and the concave portion 36 are provided at one position or a plurality of positions of the circumference.

Further, the annular projection 26 is provided on the atmospheric air side end surface of the radial portion 23 in the first lip seal member 21. The annular projection 26 comes into close contact over a whole periphery with the sealed fluid side end surface of the second lip seal member 41 at the inner peripheral side of the first flange portion 33 of the case 31, and seals between both the lip seal members 21 and 41. Accordingly, since the projection 26 mentioned above is provided, it is possible to improve a sealing performance between the first lip seal member 21, and the assembly assembled by the case 31 including the second lip seal member 41 and the backup ring 51. Further, in comparison with the rotation preventing structure being provided partially in the circumferential direction, the attitude of the second lip seal member 41 becomes more stable in the case that the annular projection 26 mentioned above is provided and the second lip seal member 41 is pressed uniformly in the circumferential direction by the first lip seal member 21, whereby it is possible to improve the sealing performance from this point of view.

The lip type seal 1 having the structure mentioned above is used, for example, as the shaft seal for a water pump for a motor vehicle as mentioned above, and is characterized by a point that the following operations and effects are achieved by the structure mentioned above.

In particular, first of all, the lip type seal 1 having the structure mentioned above has six parts including the cartridge 11, the first lip seal member 21 made of the rubber-like elastic material, the case 31, the second lip seal member 41 made of the resin, the backup ring 51 and the adapter 61, as the constructing parts thereof. Among them, the first lip seal member 21 made of the rubber-like elastic material is fitted in the non-bonding manner to the cartridge 11, the case 31 is fitted in the non-bonding manner to the first lip seal member 21, the second lip seal member 41 made of the resin and the backup ring 51 are retained by caulking to the case 31, and the adapter 61 is fitted to the cartridge 11. Accordingly, since six parts are assembled in the non-bonding manner without being bonded to each other, it is possible to easily separate and sort each of the parts at a time of disassembling the seal. Therefore, it is possible to comply with the necessity for the recycle that the constructing parts of the lip type seal 1 are disposed after being sorted on the material.

Further, since the second lip seal member 41 and the backup ring 51 are retained by caulking to the case 31, these three parts 31, 41 and 51 can be firmly assembled with each other even in the non-bonding manner, and are not displaced relatively in the axial direction. Since the case 31 is arranged in such a manner that the first flange portion 33 at the sealed fluid side comes into contact with the radial portion 23 of the first lip seal member 21 and is arranged in such a manner that the second flange portion 34 at the atmospheric air side comes into contact with the flange portion 13 of the cartridge 11, the cartridge 11, the case 31 and the first lip seal member 21 are positioned accurately in the axial direction with each other. Since the adapter 61 is fitted to the cartridge 11 at the sealed fluid side of the first lip seal member 21, the first lip seal member 21 does not come off in the axial direction from the cartridge 11. Accordingly, since all of six parts are assembled firmly in conjunction with each other, it is possible to increase the assembly retaining force among the parts. Therefore, it is possible to prevent such a disadvantage that only some of the parts are pulled out at a time of detaching the lip type seal from the housing like as the prior art from being generated.

Further, in the lip type seal 1 having the structure mentioned above, six parts have been already integrated by caulking and fitting and the assembly has been finished in the immediately usable state, at a time of installing the lip type seal 1 to the housing 72. Accordingly, it is possible to omit the regulating step or the like for maintaining the assembly length precision in the axial direction which has been required in the installing step of the conventional unbonded type lip seal mentioned above.

Further, since the first lip seal member 21 made of the rubber-like elastic material is fitted in the non-bonding manner to the cartridge 11, and the case 31 is fitted in the non-bonding manner to the first lip seal member 21, the lip type seal 1 does not have such a structure that the rubber-like elastic material (the first lip seal member 21) is vulcanization bonded to the metal (the cartridge 11 or the case 31). Therefore, the foaming phenomenon which is peculiar to the bonding structure is not generated in the rubber-like elastic material even if the lip type seal 1 is used under the high load condition. Accordingly, it is possible to improve the foaming resistance of the lip type seal 1, and it is possible to stabilize the sealing performance.

Further, since the structure is made such that the first lip seal member 21 is prevented from coming off from the cartridge 11 by fitting the adapter 61 to the sealed fluid side of the first lip seal member 21, without deforming the first lip seal member 21 largely at a time of inserting the first lip seal member 21 made of the rubber-like elastic material to the cartridge 11, the first lip seal member 21 does not deform too much. As a result, it is possible to secure the circularity and the coaxiality of the seal lip 24 of the first lip seal member 21. Accordingly, it is possible to stabilize the sealing performance by the seal lip 24 of the first lip seal member 21.

Further, since the case 31 and the second lip seal member 41 are prevented from rotating by providing the convex portion 35 at a part on the circumference in the atmospheric air side end surface of the first flange portion 33 in the case 31, and engaging the convex portion 35 with the second lip seal member 41 made of the resin, it is possible to effectively prevent the parts from rotating with each other on the basis of the simple structure in which the convex portion 35 at a part on the circumference is only provided in the case 31. Accordingly, it is possible to prevent the second lip seal member 41 made of the resin from co-rotating on the basis of the sliding motion with the shaft 74, and it is possible to stabilize the sealing performance from this point of view.

Further, since the concave portion 36 at a part on the circumference is provided in the back surface of the first flange portion 33 in accordance that the convex portion 35 is formed by the press work, and the case 31 and the first lip seal member 21 are prevented from rotating by engaging the first lip seal member 21 made of the rubber-like elastic material with the concave portion 36, it is possible to effectively prevent the parts from rotating with each other on the basis of the simple structure in which the concave portion 36 at a part on the circumference is only provided in the case 31. Accordingly, it is possible to prevent the assembled product constructed by the second lip seal member 41, the backup ring 51 and the case 31 from co-rotating due to the sliding motion with the shaft 74, whereby it is possible to stabilize the sealing performance from this point of view.

Further, since the annular projection 26 coming into close contact over a whole periphery with the sealed fluid side end surface of the second lip seal member 41 at the inner peripheral side of the first flange portion 33 in the case 31 is provided on the atmospheric air side end surface of the radial portion 23 in the first lip seal member 21, it is possible to improve the sealing performance of the portion. Further, since the annular projection 26 presses the second lip seal member 41 over a whole periphery, it is possible to stabilize the attitude of the second lip seal member 41. Therefore, it is possible to stabilize the sealing performance from this point of view.

Second Embodiment

Figure 3:
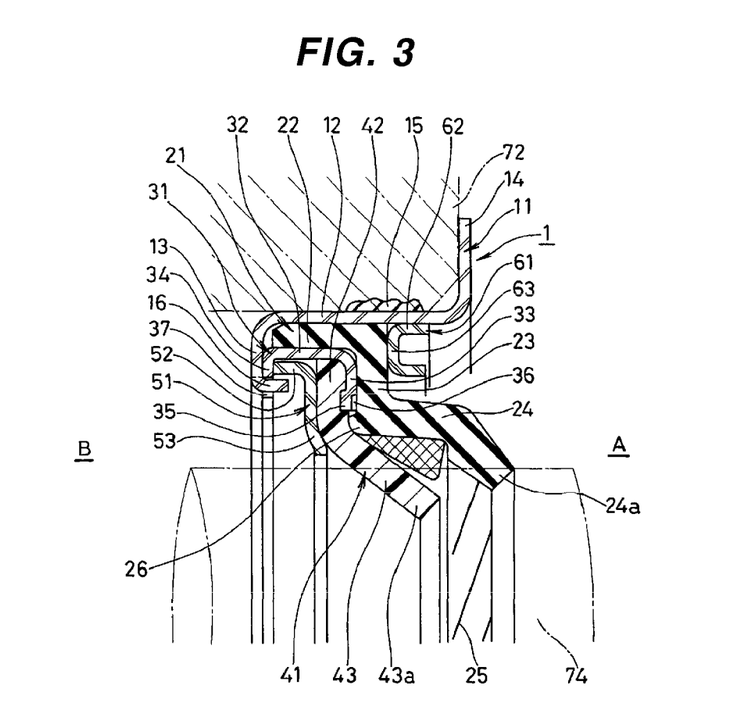
FIG. 3 is a sectional view of a substantial part of a lip type seal in accordance with a second embodiment of the present invention.

In this case, the first embodiment mentioned above is structured such that the flange portion 13 of the cartridge 11 and the second flange portion 34 of the case 31 are brought into contact with each other in the axial direction, however, if a rotation preventing structure is provided there, it is possible to effectively prevent the assembly constructed by the second lip seal member 41 made of the resin, the backup ring 51 and the case 31 from co-rotating due to the sliding motion with the shaft 74. FIG. 3 shows a structure in which the rotation preventing structure mentioned above is provided as the second embodiment. In particular, the cartridge 11 and the case 31 are prevented from rotating by providing a claw portion 16 at a part on a circumference on an inner peripheral edge portion of the flange portion 13 of the cartridge 11, providing a notch portion 37 in an inner peripheral edge portion of the second flange portion 34 of the case 31 in correspondence to the claw portion 16, and bending the claw portion 16 to the sealed fluid side A so as to engage with the notch portion 37. The claw portion 16 and the notch portion 37 are provided at one position or a plurality of positions (for example, three positions uniformly) on the circumference.

The seal lip 24 of the first lip seal member 21 in the first embodiment mentioned above is provided with a screw portion (a screw seal) 25 achieving a sealing action by carrying out a pumping action so as to push back the sealed fluid at a time when the shaft rotates, in a sliding portion thereof, however, the following variations can be thought with regard to this screw portion 25.

Third Embodiment

Figure 4:
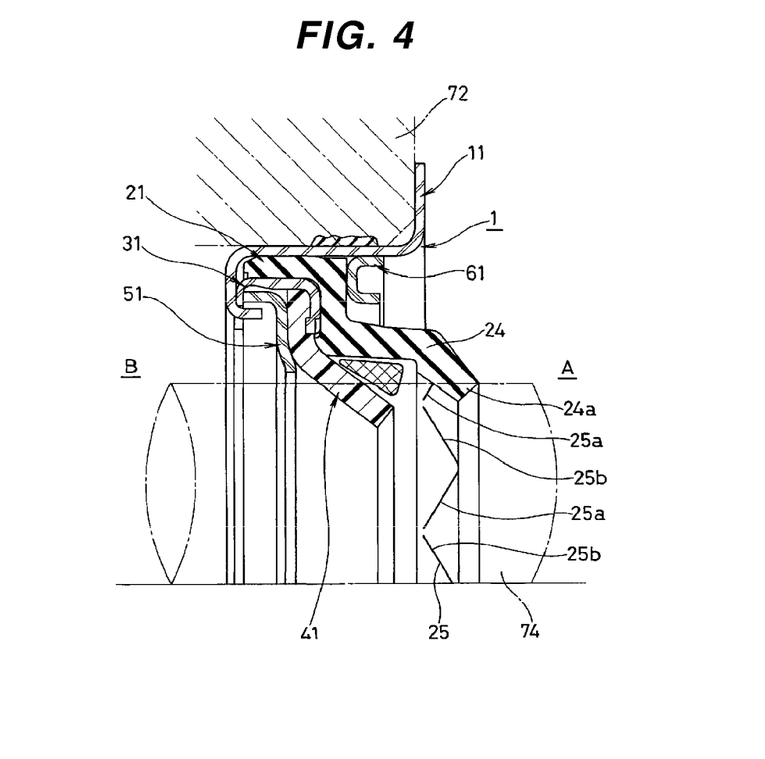
FIG. 4 is a sectional view of a substantial part of a lip type seal in accordance with a third embodiment of the present invention.

In particular, the screw portion 25 is formed as a one-way screw structure in FIG. 1 showing the first embodiment mentioned above. On the other hand, in FIG. 4 showing a third embodiment, the screw portion 25 is formed as a two-way screw structure, in which a lot of forward direction screws (unit screws) 25a and backward direction screws (unit screws) 25b having opposite directions of inclination (directions of screw inclination) to each other are provided alternately on a circumference. Since the rotating direction of the shaft 74 is generally decided per kind of a pump, the screw portion 25 sufficiently functions if it has the one-way screw structure, however, when considering installation of the lip type seal 1 to many kinds of pumps, it is preferable that the screw portion 25 has the two-way screw structure, and if the screw portion 25 has the two-way screw structure as mentioned above, the lip type seal is applicable whichever direction the shaft 74 rotates.

Fourth Embodiment

Figure 5:
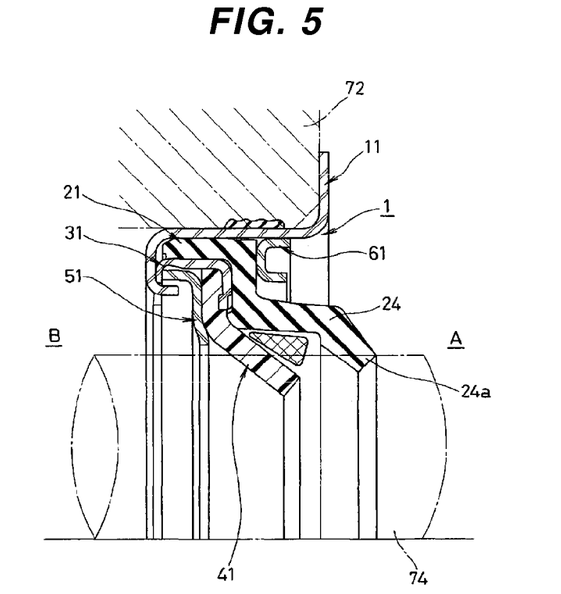
FIG. 5 is a sectional view of a substantial part of a lip type seal in accordance with a fourth embodiment of the present invention.

In this case, since the screw portion 25 is an additional structure in the present invention, the screw portion 25 may be omitted like as FIG. 5 shown as the fourth embodiment. This structure with no screw is used in the case that it is intended to improve the sealing performance of the seal lip 24 to the shaft 74 to thereby improve the sealing performance.

Further, although an illustration is omitted, there can be thought that the sliding portion of the seal lip 24 is provided with a screw portion achieving a lubricating action by carrying out a pumping action so as to suck the sealed fluid when the shaft rotates, as the screw portion 25.

With regard to the cartridge 11, the following variations can be thought.

In particular, in order to adapt the lip type seal 1 to a bore diameter (an inner diameter of the shaft hole) of the housing 72, a cartridge having a three-dimensional structure in a radial direction is used as the cartridge 11. In accordance with this structure, it is possible to apply it to many kinds of pumps by preparing the lip type seal 1 of one size. Further, it is possible to apply to many kinds of pumps if preparing the cartridges 11 provided with different S-shaped sections in a positional relationship to the housing shape and the peripheral parts, and it is possible to change a mechanical seal to it.

Fifth to Seventh Embodiments

Figure 6:
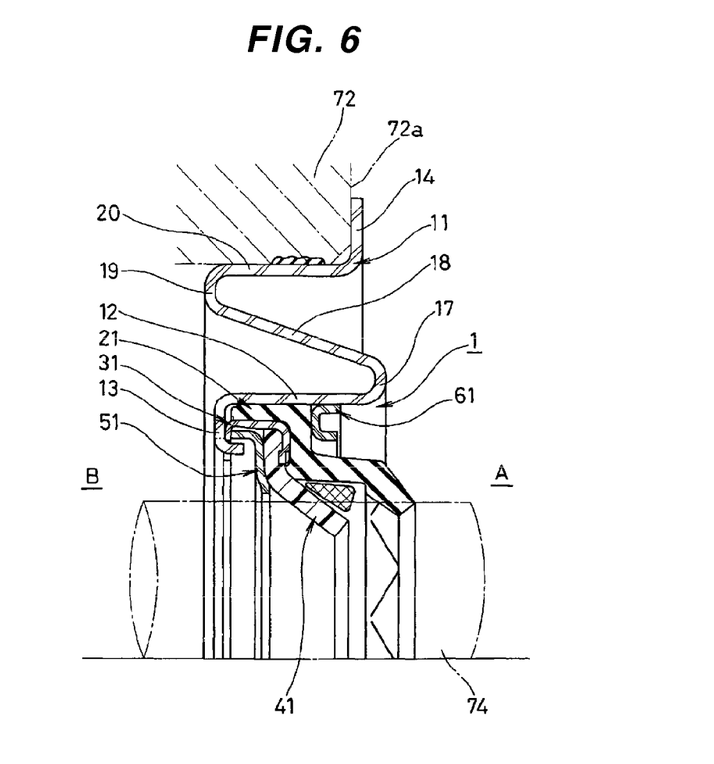
FIG. 6 is a sectional view of a substantial part of a lip type seal in accordance with a fifth embodiment of the present invention.
Figure 7:
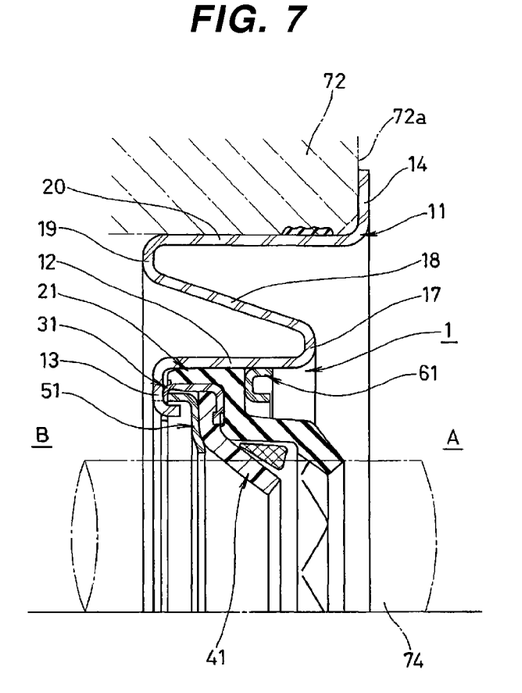
FIG. 7 is a sectional view of a substantial part of a lip type seal in accordance with a sixth embodiment of the present invention.
Figure 8:
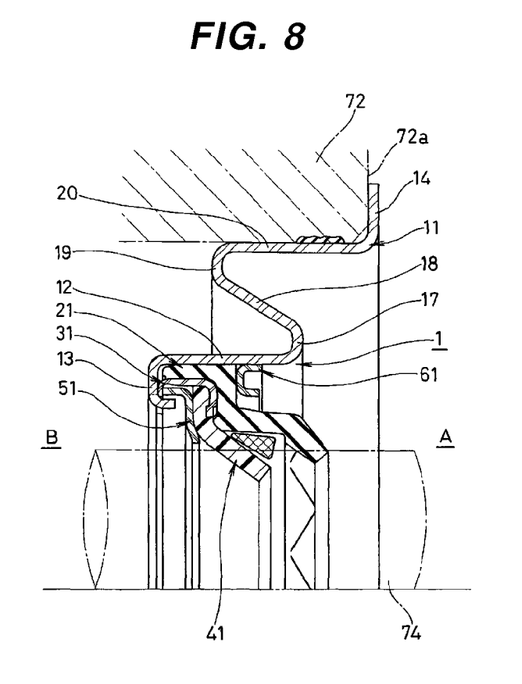
FIG. 8 is a sectional view of a substantial part of a lip type seal in accordance with a seventh embodiment of the present invention.

From this point of view, the cartridge 11 is structured as follows, in FIG. 6 showing a fifth embodiment, FIG. 7 showing a sixth embodiment and FIG. 8 showing a seventh embodiment.

In particular, the cartridge 11 is constructed by a predetermined rigid material such as a metal or the like, for example, a press worked product of a metal plate, is formed in an annular shape as a whole, and has a tubular portion 12 in which an inward flange portion 13 is integrally formed on the atmospheric air side end portion, an inner peripheral side reverse portion 17 having a circular arc shaped section toward an outer side in a radial direction is integrally formed on the sealed fluid side end portion of the tubular portion 12, a radially enlarged portion 18 having a linear shaped section is integrally formed from an outer peripheral end portion of the inner peripheral side reverse portion 17 toward a diagonally outer side in the radial direction, an outer peripheral side reverse portion 19 having a circular arc shaped section toward an outer side in the radial direction is integrally formed on an outer peripheral end portion of the radially enlarged portion 18, an outer peripheral side tubular portion 20 is integrally formed from an outer peripheral end portion of the outer peripheral side reverse portion 19 toward one side (the sealed fluid side) in the axial direction, an outward flange portion 14 is integrally formed on a sealed fluid side end portion of the outer peripheral side tubular portion 20, and the cartridge 11 retains the first lip seal member 21 and the adapter 61 in the inner peripheral side of the tubular portion 12, and is fitted to the inner periphery of the shaft hole of the housing 72 by the outer peripheral side tubular portion 20. The cartridge 11 is formed in an S-shaped section as a whole. The radially enlarged portion 18 may be formed into a flat surface shape which is orthogonal to a center axis of the lip type seal 1.

In the example in FIG. 6, there is formed in such a shape that the outer peripheral side reverse portion 19 protrudes to one side (the atmospheric air side) in the axial direction rather than the inward flange portion 13, and the inner peripheral side reverse portion 17 protrudes to one side (the sealed fluid side) in the axial direction rather than the outward flange portion 14. In the example in FIG. 7, there is formed in such a shape that the outer peripheral side reverse portion 19 protrudes to one side (the atmospheric air side) in the axial direction rather than the inward flange portion 13, and the outward flange portion 14 protrudes to one side (the sealed fluid side) in the axial direction rather than the inner peripheral side reverse portion 17. Further, in the example in FIG. 8, there is formed in such a shape that the inward flange portion 13 protrudes to one side (the atmospheric air side) in the axial direction rather than the outer peripheral side reverse portion 19, and the outward flange portion 14 protrudes to one side (the sealed fluid side) in the axial direction rather than the inner peripheral side reverse portion 17. As mentioned above, it is possible to regulate the insertion depth in the axial direction of the lip type seal 1 with respect to the end surface 72a of the housing 72 by appropriately changing the shapes.

what is claimed is:

1. A lip type seal inhibiting a sealed fluid in a machine from leaking to an atmospheric air side by being installed to an inner periphery of a shaft hole of a housing so as to slidably come into close contact with a peripheral surface of a shaft, the lip type seal comprising:
   a cartridge having a tubular portion fitted to an inner periphery of said shaft hole;
   a first lip seal member made of a rubber-like elastic material and fitted in a non-bonding manner to said cartridge;
   a case fitted in a non-bonding manner to said first lip seal member;
   a second lip seal member made of a resin and a backup ring supporting the second lip seal member which are retained by caulking axially inside said case; and
   an adapter fitted to said cartridge at a sealed fluid side of said first lip seal member,
   wherein said cartridge integrally has an inward flange portion on an atmospheric air side end portion of the tubular portion,
   wherein said first lip seal member integrally has a cylinder portion fitted to an inner peripheral side of the tubular portion of said cartridge, a radial portion provided on a sealed fluid side end portion of said cylinder portion, and a seal lip provided on an inner peripheral end portion of said radial portion, wherein said case integrally has a tubular portion fitted to a portion between said radial portion and the flange portion of the cartridge in an inner peripheral side of the cylinder portion of said first lip seal member, a first flange portion provided on the sealed fluid side end portion of said tubular portion in such a manner as to come into contact with said radial portion, and a second flange portion provided on the atmospheric air side end portion of said tubular portion in such a manner as to come into contact with the flange portion of said cartridge, said second lip seal member and the backup ring are retained by caulking between said first and second flange portions, and wherein said adapter prevents said first lip seal member from coming off from said cartridge by being fitted to said cartridge at the sealed fluid side of said first lip seal member.

2. The lip type seal as claimed in claim 1, wherein a convex portion at a part on a circumference is provided in the atmospheric air side end surface of the first flange portion in the case, and said convex portion engages with the second lip seal member made of the resin, whereby said case and the second lip seal member are prevented from rotating.

3. The lip type seal as claimed in claim 2, wherein said convex portion is formed by a press work, whereby a concave portion at a part on a circumference corresponding to said convex portion is provided in the sealed fluid side end surface of the first flange portion, and the first lip seal member made of the rubber-like elastic material engages with said concave portion, whereby said case and the first lip seal member are prevented from rotating.

4. The lip type seal as claimed in claim 1, wherein a claw portion at a part on a circumference is provided on an inner peripheral edge portion of the flange portion in the cartridge, a notch portion is provided in an inner peripheral edge portion of the second flange portion in the case in correspondence to said claw portion, and said claw portion is bent so as to engage with said notch portion, whereby said cartridge and the case are prevented from rotating.

5. The lip type seal as claimed in claim 1, wherein an annular projection coming into close contact over a whole periphery with the sealed fluid side end surface of the second lip seal member at an inner peripheral side of the first flange portion in the case is provided on an atmospheric side end surface of the radial portion in the first lip seal member.

6. The lip type seal as claimed in claim 2, wherein a claw portion at a part on a circumference is provided on an inner peripheral edge portion of the flange portion in the cartridge, a notch portion is provided in an inner peripheral edge portion of the second flange portion in the case in correspondence to said claw portion, and said claw portion is bent so as to engage with said notch portion, whereby said cartridge and the case are prevented from rotating.

7. The lip type seal as claimed in claim 3, wherein a claw portion at a part on a circumference is provided on an inner peripheral edge portion of the flange portion in the cartridge, a notch portion is provided in an inner peripheral edge portion of the second flange portion in the case in correspondence to said claw portion, and said claw portion is bent so as to engage with said notch portion, whereby said cartridge and the case are prevented from rotating.

8. The lip type seal as claimed in claim 2, wherein an annular projection coming into close contact over a whole periphery with the sealed fluid side end surface of the second lip seal member at an inner peripheral side of the first flange portion in the case is provided on an atmospheric side end surface of the radial portion in the first lip seal member.

9. The lip type seal as claimed in claim 3, wherein an annular projection coming into close contact over a whole periphery with the sealed fluid side end surface of the second lip seal member at an inner peripheral side of the first flange portion in the case is provided on an atmospheric side end surface of the radial portion in the first lip seal member.

10. The lip type seal as claimed in claim 4, wherein an annular projection coming into close contact over a whole periphery with the sealed fluid side end surface of the second lip seal member at an inner peripheral side of the first flange portion in the case is provided on an atmospheric side end surface of the radial portion in the first lip seal member.

11. The lip type seal as claimed in claim 6, wherein an annular projection coming into close contact over a whole periphery with the sealed fluid side end surface of the second lip seal member at an inner peripheral side of the first flange portion in the case is provided on an atmospheric side end surface of the radial portion in the first lip seal member.

12. The lip type seal as claimed in claim 7, wherein an annular projection coming into close contact over a whole periphery with the sealed fluid side end surface of the second lip seal member at an inner peripheral side of the first flange portion in the case is provided on an atmospheric side end surface of the radial portion in the first lip seal member.

* * * * *